(12) United States Patent
Matsushita et al.

(10) Patent No.: US 8,137,086 B2
(45) Date of Patent: Mar. 20, 2012

(54) PREFORM HEATING SYSTEM

(75) Inventors: Yousuke Matsushita, Yokohama (JP); Noboru Sawane, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 407 days.

(21) Appl. No.: 12/516,627

(22) PCT Filed: Oct. 4, 2007

(86) PCT No.: PCT/JP2007/069437
§ 371 (c)(1),
(2), (4) Date: May 28, 2009

(87) PCT Pub. No.: WO2008/068950
PCT Pub. Date: Jun. 12, 2008

(65) Prior Publication Data
US 2010/0068323 A1    Mar. 18, 2010

(30) Foreign Application Priority Data
Dec. 8, 2006 (JP) ................. 2006-331361

(51) Int. Cl.
*B29C 49/68* (2006.01)
*B29C 31/08* (2006.01)

(52) U.S. Cl. ............... 425/3; 425/526; 425/534
(58) Field of Classification Search ............. 425/3, 526, 425/534
See application file for complete search history.

(56) References Cited

U.S. PATENT DOCUMENTS

| | | | |
|---|---|---|---|
| 5,853,775 A * | 12/1998 | Oas et al. ................. | 425/526 |
| 6,113,840 A * | 9/2000 | Emmer et al. ............ | 425/526 |
| 6,669,010 B1 * | 12/2003 | Venturato et al. ........ | 198/867.09 |

* cited by examiner

*Primary Examiner* — Robert B Davis
(74) *Attorney, Agent, or Firm* — Kratz, Quintos & Hanson, LLP

(57) ABSTRACT

This invention is configured having a control mechanism which supports a preform and controls the state of rotation of a support member being moved through a heating region so as to control the orientation of the preform with respect to heating devices, the control mechanism having a first magnetic pole member arranged along at least a part of the heating region and a second magnetic pole member fastened at a portion of the support member being moved through the heating region facing the first magnetic pole member, the support member moved through the heating region being set to a rotation state determined by a relationship between the polarity of the first magnetic pole member and the polarity of the second magnetic pole member.

6 Claims, 8 Drawing Sheets

[FIG. 1]
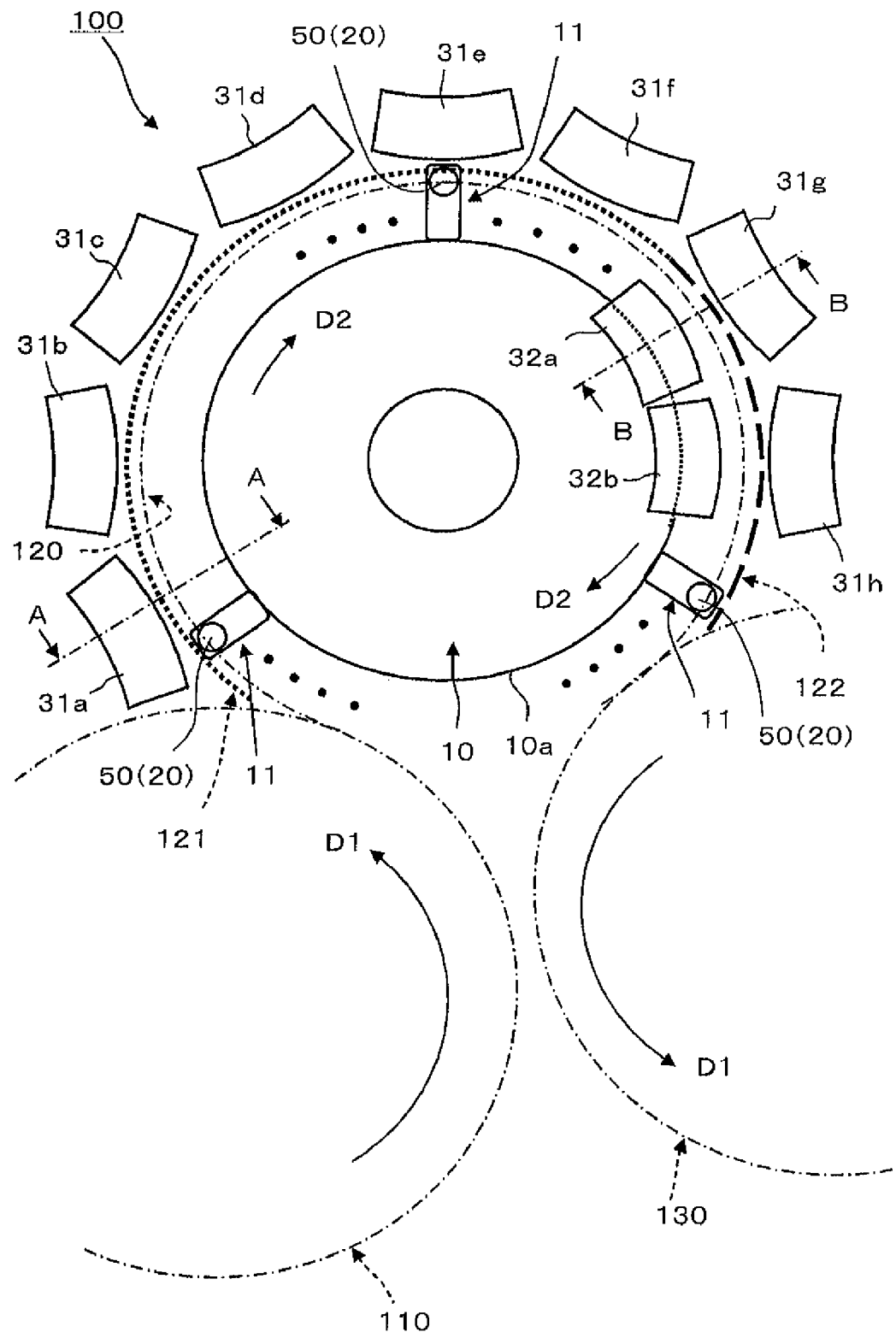

[FIG. 2]
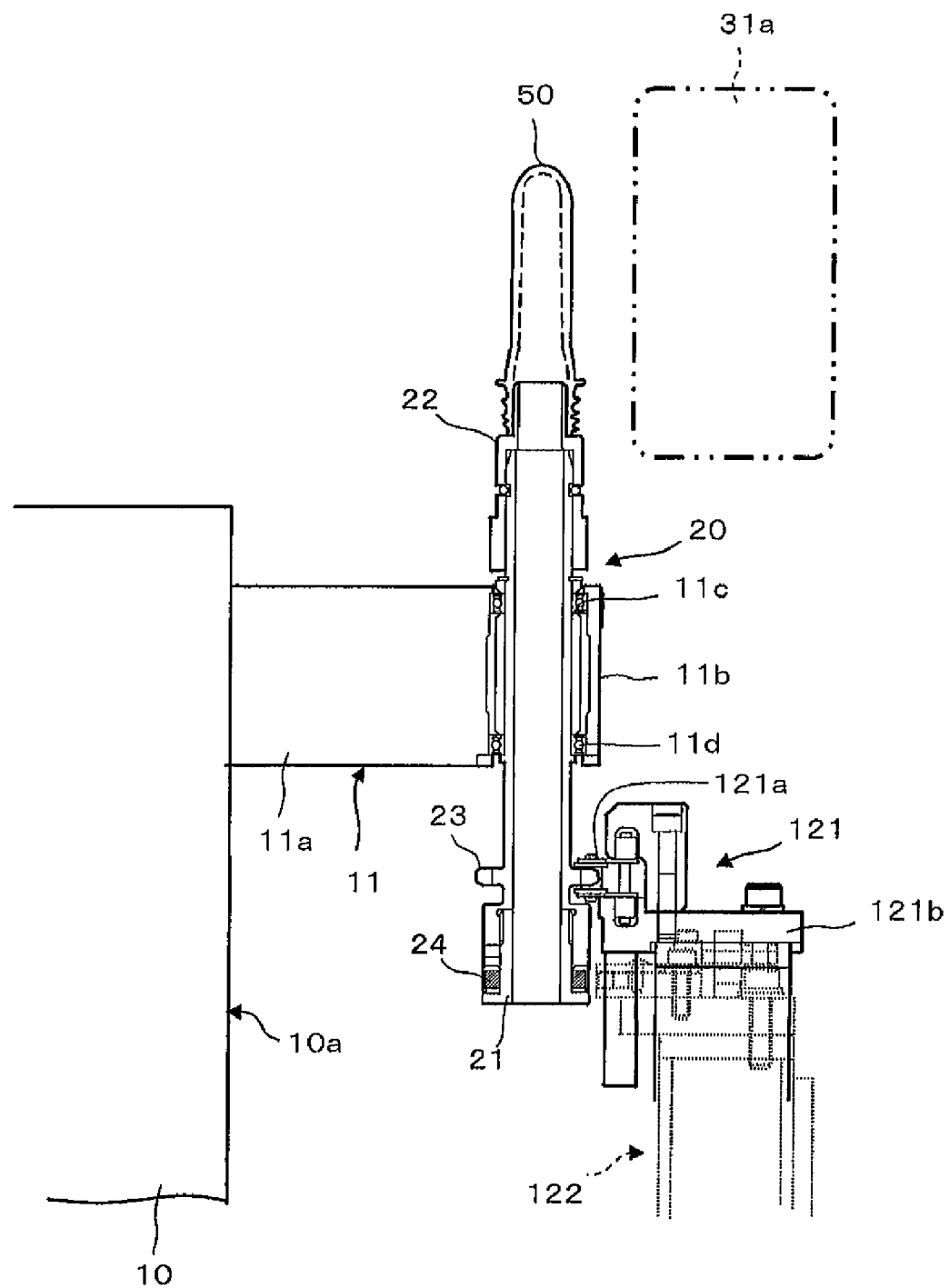

[FIG. 3]
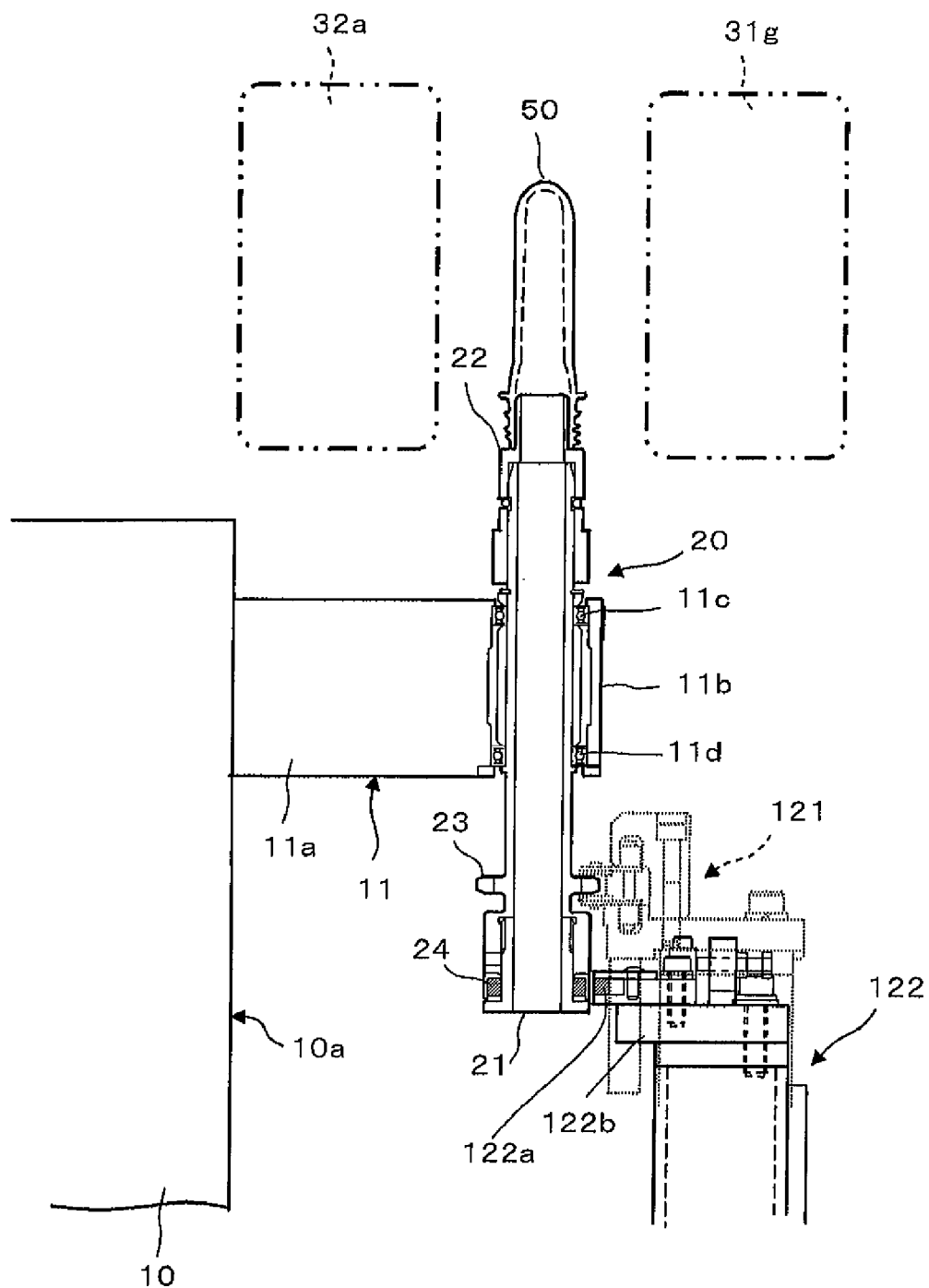

[FIG. 4]
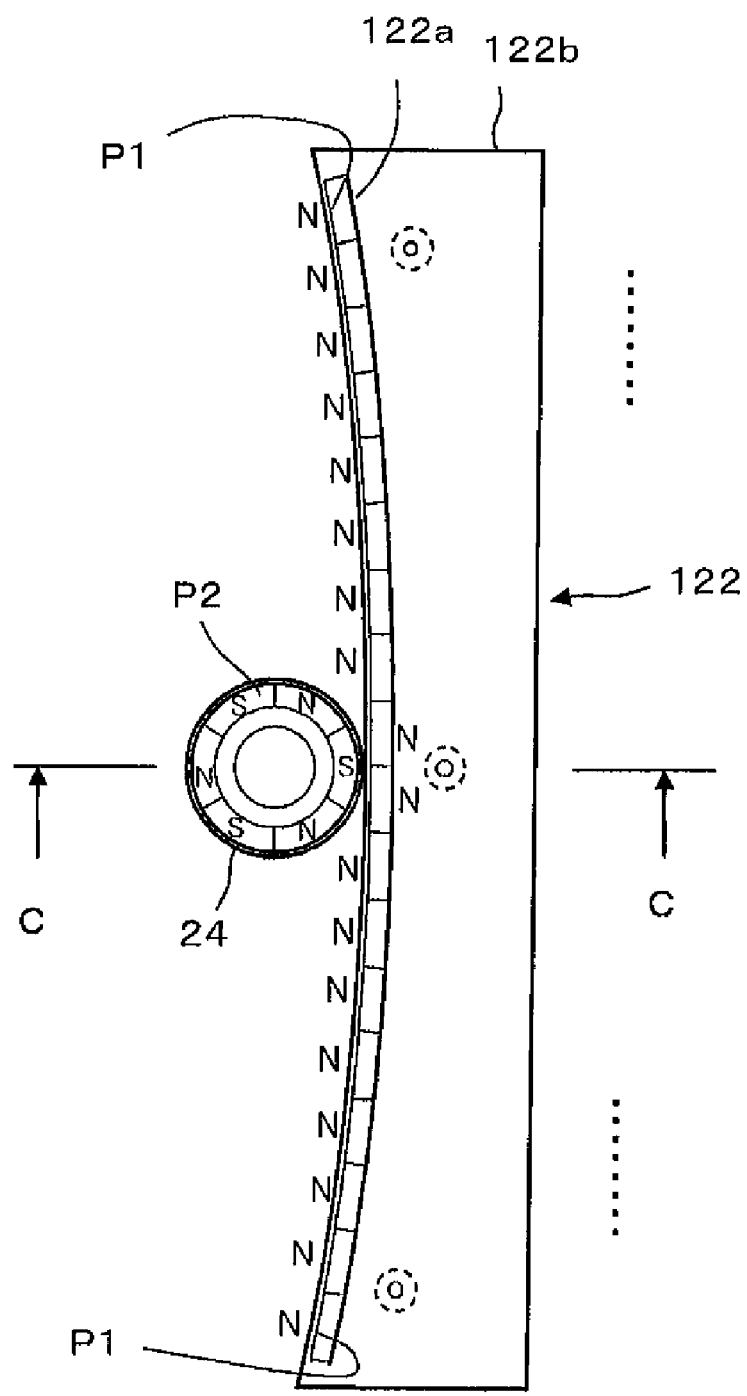

[FIG. 5A]
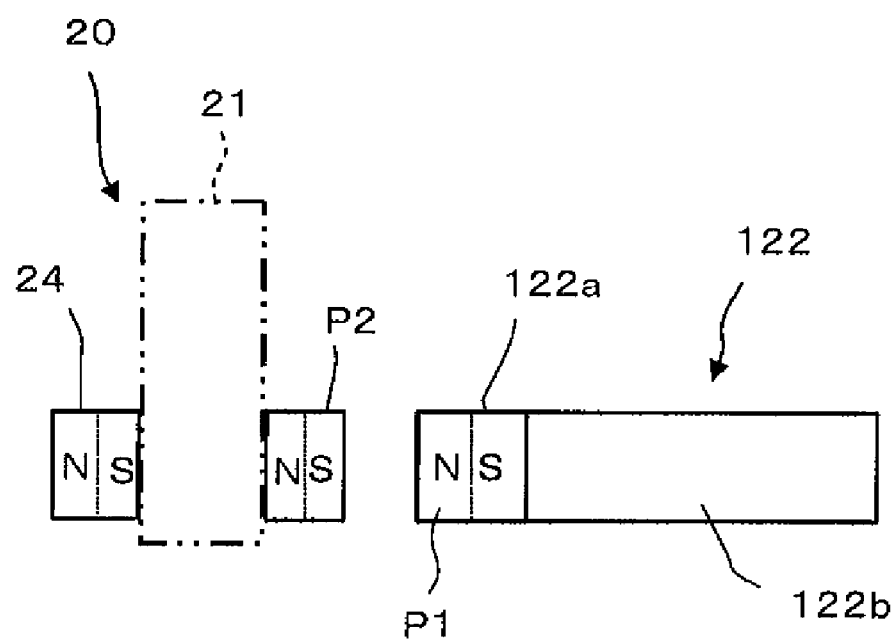

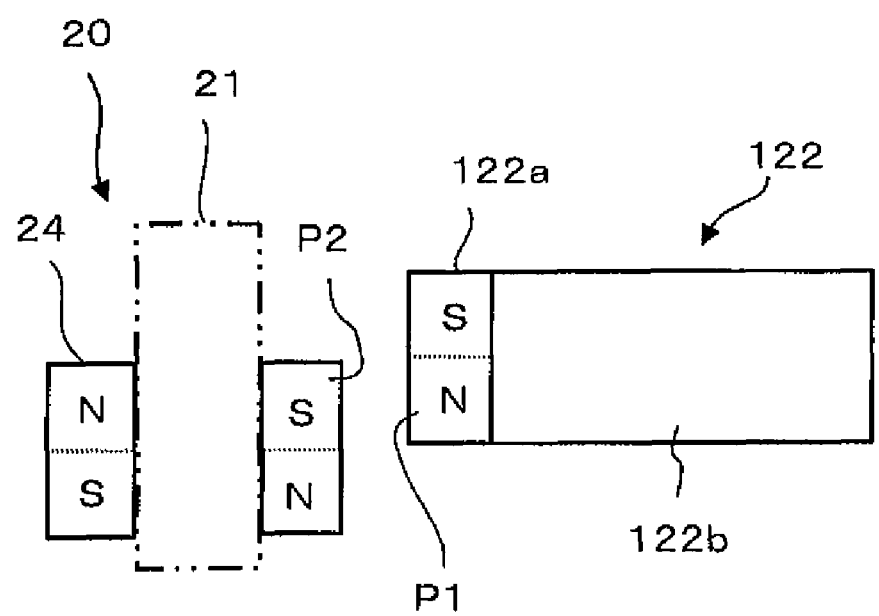
[FIG. 5B]

[FIG. 6]
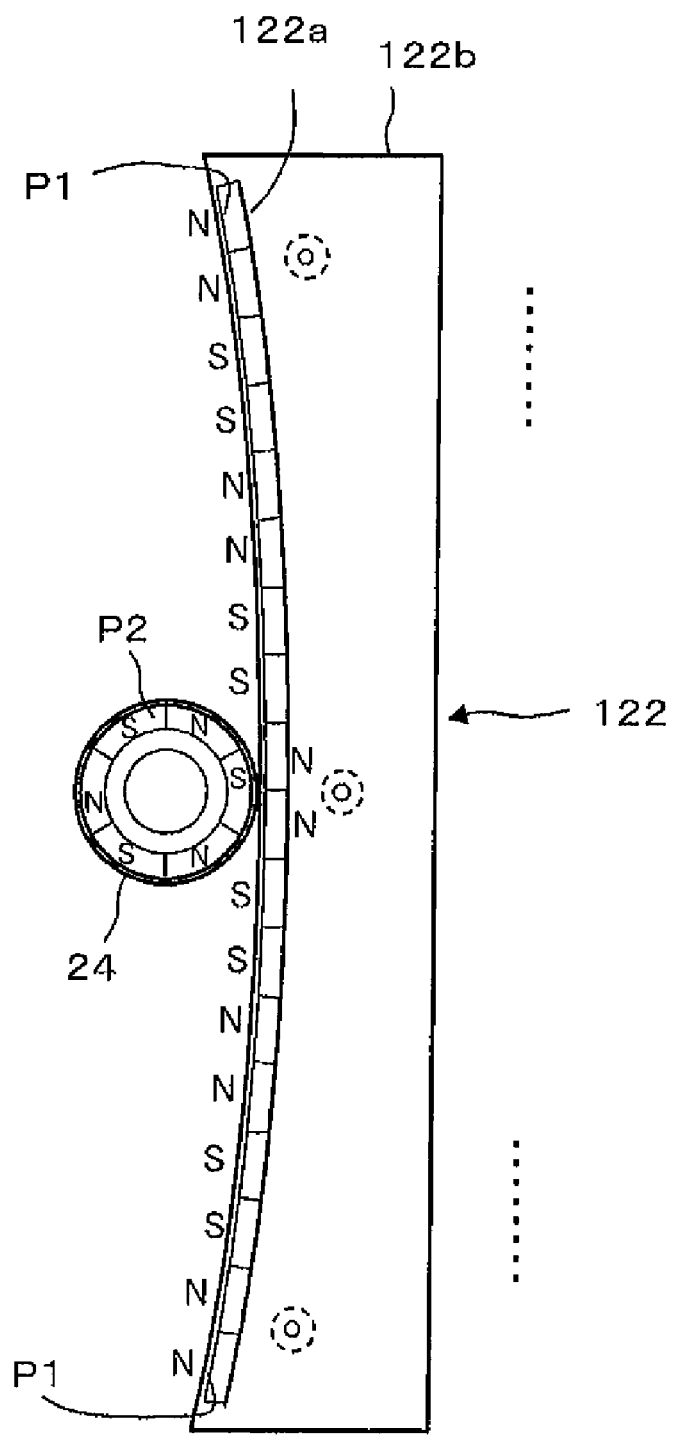

[FIG. 7]
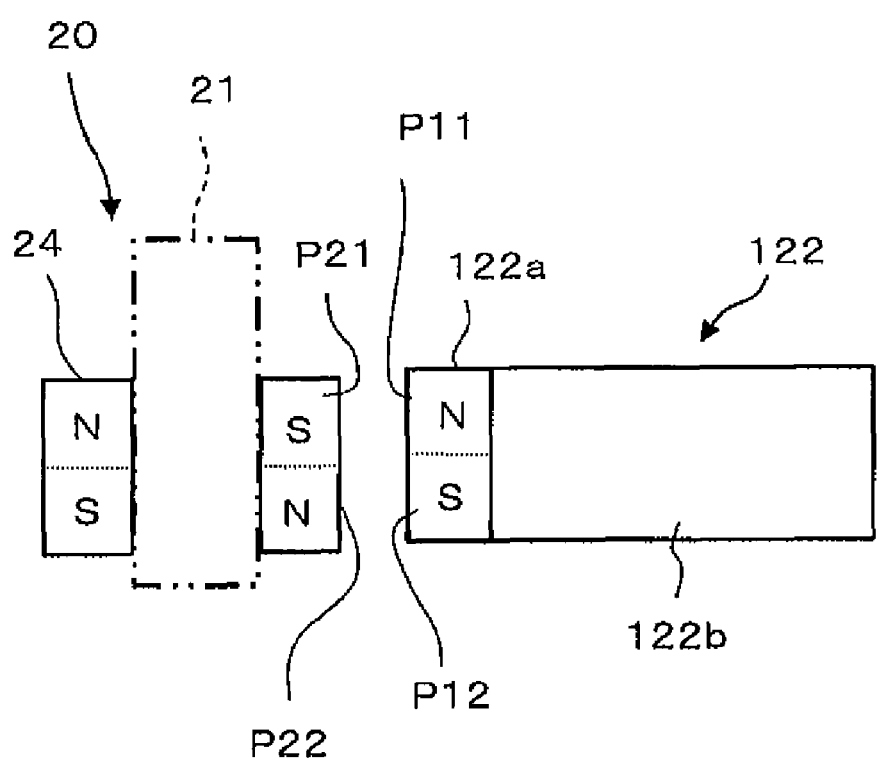

PREFORM HEATING SYSTEM

TECHNICAL FIELD

The present invention relates to a preform heating system for heating a plastic preform for forming a container by blow molding before that blow molding.

BACKGROUND ART

A PET bottle or other plastic bottle (container) can be produced by blow molding a heated preform. A preform for forming a bottle with a cross-sectional shape of a circular shape or other shape with a length in the diametrical direction substantially even in all directions is usually heated so that a temperature distribution of its outer surface becomes substantially even in all directions. As opposed to this, with a bottle with a cross-sectional shape with a length in the diametrical direction not even in all directions, for example, a cross-section of an oval shape or a cross-section of a flat rectangular shape, the elongation in the diametrical direction at the time of blow molding differs according to the direction, so the preform has to be heated at the outer surface so as to obtain a temperature distribution corresponding to the elongation.

In the past, a heating system able to give a suitable temperature distribution to the outer surface of a preform based on the shape of a container after blow molding has been proposed (see Patent Document 1). In this system, bent segments guiding and making a support element supporting a preform move by translational movement and rotating disks driving the support element to rotate are alternately arranged in a heating path region provided in the heating system. Further, by making the support element supporting the preform alternately move through bent segments and rotating disks and making the support element rotate by the rotating disks, the outer surface of the preform is heated relatively uniformly. On the other hand, by the support element moving through the bent segments by translational movement, the region of the preform directly facing the heating devices is heated. By suitably controlling the time of translational motion, the temperature distribution of the outer surface of the preform can be made one suitable for production of a bottle with a cross-section of a length in the diametrical direction not even in all directions, for example, a cross-section of an oval shape or a cross-section of a flat rectangular shape.

Patent Document 1: Japanese Patent Publication (A) No. 2003-526544

DISCLOSURE OF THE INVENTION

Problem to be Solved by the Invention

By the way, in the above-mentioned conventional system, the temperature distribution of the outer circumferential surface of the preform is made to become one suitable for when blow molding a bottle with a cross-section with a length of the diametrical direction not even in all directions, for example, a cross-section of an oval shape or a cross-section of a flat rectangular shape, by controlling the translational motion of the preform so that the region of its outer circumferential surface which should be made a higher temperature faces the heating devices for a long period of time. However, in such a system, when heating a preform so as to blow mold a bottle with a length of the diametrical direction becoming substantially even in all directions, for example, a circular shape, it is necessary to stop the operation of the heating devices in the regions for translational movement arranged alternately with the regions for rotational movement of the preform and therefore efficient heating is not possible. Further, modification of the system so that the preform constantly moves while rotating to make the outer surface of the preform a uniform temperature distribution without lowering the efficiency of the heating, it is necessary to basically change the structure of the system. This is substantially impossible.

The present invention was made in consideration of this situation and provides a preform heating system easily enabling a preform to be moved through a heating region while making it rotate without greatly sacrificing efficient heating and enabling it to be moved through the heating region without making it rotate (while making it move by translation).

Means for Solving the Problem

The preform heating system according to the present invention has a movement mechanism making a support member able to rotate while the support member is supporting a plastic preform for forming a container by blow molding move over a predetermined path, heating devices provided along a heating region set on the path and heating the preform supported by the moving support member, and a control mechanism controlling a rotational state of the support member moving through the heating region and controlling an orientation of the preform with respect to the heating devices, wherein the control mechanism has a first magnetic pole member arranged along at least a part of the heating region and a second magnetic pole member fastened to the support member so that when the support member moves through the heating region, it faces the first magnetic pole member, and the support member moving through the heating region is made a rotational state determined by the relationship between the polarity of the first magnetic pole member and the polarity of the second magnetic pole member.

Due to this configuration, the rotational state of the support member is determined by the relationship between the polarity of the first magnetic pole member arranged along at least a part of the heating region and the polarity of the second magnetic pole member fastened to a portion of the support member supporting the preform and moving through the heating region facing the first magnetic pole member, so by making the relationship between the polarity of the first magnetic pole member and the polarity of the second magnetic pole member one of mutual attraction, it is possible to stop rotation of the support member when the support member supporting the preform moves over the heating region (possible to set the rotational state of "no rotation"). Further, by making the relationship between the polarity of the first magnetic pole member and the polarity of the second magnetic pole member one of repeated repulsion and attraction along with movement of the support member, it is possible to cause the support member to rotate when the support member supporting the preform moves by the repetition of the repulsion force and attraction force between the second magnetic pole member fastened to the support member and the first magnetic pole member arranged along the heating region.

Further, in the preform heating system according to the present invention, the first magnetic pole member has a single polarity at a surface facing the second magnetic pole member, and the second magnetic pole member has magnetic poles of a polarity opposite to the single polarity arranged at a surface facing the first magnetic pole member.

Due to this configuration, the first magnetic pole member and the second magnetic pole member are constantly attracting each other, so when the support member supporting the preform moves, the attraction force can be used to stop rotation of the support member (to set a non-rotating state).

Further, in the preform heating system according to the present invention, the second magnetic pole member is fastened to the support member so as to be become coaxial with its axis of rotation and a plurality of magnetic poles are arranged in a ring so that their polarities alternately change.

Due to this configuration, by making the surface of the first magnetic pole member facing the second magnetic pole member a single polarity, the second magnetic pole member fastened so as to become coaxial with the support member faces the magnetic pole parts having a polarity opposite to the single polarity of the first magnetic pole member and is attracted by the first magnetic pole member. When the support member supporting the preform moves over the heating region in this state, the attraction between the first magnetic pole member and second magnetic pole member can be used to stop rotation of the moving support member.

Furthermore, in the preform heating system according to the present invention, the first magnetic pole member has a plurality of magnetic poles arranged so as to alternately change in polarity on a surface facing the second magnetic pole member, and the second magnetic pole member is fastened so that its axis of rotation becomes coaxial with the support member and has a plurality of magnetic poles arranged in a ring so as to alternately change in polarity.

Due to this configuration, the relationship between the polarity of the first magnetic pole member and the polarity of the second magnetic pole member becomes a relationship where repulsion and attraction are alternately repeated together with movement of the support member, so by alternate repetition of the repulsion force and attraction force between the second magnetic pole member fastened to the support member and the first magnetic pole member arranged along the heating region when the support member supporting the preform moves, the support member can be made to rotate.

Further, in the preform heating system according to the present invention, the control mechanism has a first control mechanism part and a second control mechanism part, the first mechanism part has a ring-shaped tooth member provided at the support member so as to become coaxial with an axis of rotation of the support member and a belt-shaped tooth receiving member arranged along a predetermined part of the heating region and engaging with the ring-shaped tooth member while rotating, the second mechanism part has the first magnetic pole member and the second magnetic pole member, and the first magnetic pole member is set at a part other than the predetermined part of the heating region.

Due to this configuration, in the first mechanism part, the ring-shaped tooth member provided at the support member coaxially with its axis of rotation meshes with the belt-shaped tooth receiving member arranged along a predetermined part of the heating region, so when the support member supporting the preform moves through the predetermined part of the heating region, the ring-shaped tooth member meshing with the belt-shaped tooth receiving member rotates and the rotational force can be used to make the coaxial support member rotate. Further, in the second mechanism part, the first magnetic pole member arranged along part of the heating region other than where the belt-shaped tooth receiving member is arranged and the second magnetic pole member provided at the support member are constantly attracted to each other, so when the support member supporting the preform moves through the part of the heating region other then the predetermined part, the attraction force can stop rotation of the support member. Therefore, the support member supporting the preform can move through the predetermined part of the heating region while rotating and can move through the part of the heating region other than the predetermined part in a state with rotation stopped.

Furthermore, in the preform heating system according to the present invention, the second magnetic pole member is fastened to the support member so as to become coaxial with its axis of rotation and has a plurality of magnetic poles arranged in a ring so as to alternately change in polarity.

According to this configuration, by changing the configuration of the first magnetic pole member to have a plurality of magnetic poles arranged so that the polarity alternately changes, it is possible to easily make the support member rotate when the support member supporting the preform moves.

Effects of the Invention

According to the preform heating devices according to the present invention, if setting the polarity of the first magnetic pole member and the polarity of the second magnetic pole member so that the members mutually attract each other, when the support member supporting the preform moves over the heating region, it is possible to stop rotation of the support member, while if setting the polarity of the first magnetic pole member and the polarity of the second magnetic pole member so that the members alternately repeatedly repulse and attract each other along with movement of the support member, when the support member supporting the preform moves, it is possible to make the support member rotate by the alternate repetition of a repulsion force and attraction force between the second magnetic pole member fastened to the support member and the first magnetic pole member arranged along the heating region. In this way, by just changing the relationship between the polarity of the first magnetic pole member and the polarity of the second magnetic pole member, it is possible to make the support member supporting the preform move over part of the heating region where the first magnetic pole member is arranged while rotating and possible to make it move over that in the state stopping the rotation of the support member, so it is possible to easily enable a preform to be moved through a heating region while making it rotate without greatly sacrificing efficient heating and enable it to be moved through the heating region without making it rotate (while making it translate).

BRIEF DESCRIPTION OF THE DRAWINGS

[FIG. 1] A plan view showing the overall configuration of a preform heating system according to an embodiment of the present invention.

[FIG. 2] A cross-sectional view of a part A-A in FIG. 1.

[FIG. 3] A cross-sectional view of a part B-B in FIG. 1.

[FIG. 4] A view showing an example of the configuration of a second control mechanism part.

[FIG. 5A] A cross-sectional view showing a first example of a C-C cross-section of FIG. 4.

[FIG. 5B] A cross-sectional view showing a second example of a C-C cross-section of FIG. 4.

[FIG. 6] A view showing another example of the configuration of a second control mechanism part.

[FIG. 7] A cross-sectional view showing a third example of a C-C cross-section of FIG. 4.

EXPLANATION OF NOTATIONS

10 drum
11 holder member 11a arm
11b holder body
11c, 11d bearings
12 plate
20 support member
21 body
22 mount
23 sprocket
24 ring-shaped magnetic pole member
31a to 31h, 32a, 32b heating devices
50 preform
100 preform heating system
110 feed side conveyance path
120 path of movement
121 chain guide mechanism
121a chain belt
121b fastening member
122 magnet guide mechanism
122a belt-shaped magnetic pole member
122b fastening member
130 take-out side conveyance path

BEST MODE FOR CARRYING OUT THE INVENTION

Below, embodiments of the present invention will be explained using the drawings.

Referring to FIG. 1 to FIG. 4, a preform heating system according to an embodiment of the present invention will be explained. Note that, FIG. 1 is a plan view showing the overall configuration of a preform heating system, FIG. 2 is an A-A cross-sectional view in FIG. 1, FIG. 3 is a B-B cross-sectional view in FIG. 1, and FIG. 4 is a view showing an example of the configuration of a second control mechanism part.

In FIG. 1, this preform heating system 100, for example, has a drum 10 rotating in a clockwise direction D2. From the outer circumferential surface 10a of this drum 10, a plurality of holder members 11 stick out radially. At the front end of each holder member 11, a support member 20 is held so as to be able to freely rotate on an axis in the same direction (vertical direction) as the axis of rotation of the drum 10. A preform 50 formed of a thermoplastic resin, for example, PET, is supported by being mounted on the front end of each support member 20. Due to this configuration, when the drum 10 rotates in the clockwise direction D2, the preform 50 mounted at the front end of the support member 20 held at each holder member 11 moves over an arc-shaped path of movement 120.

At the upstream side end of the path of movement 120, an arc-shaped feed side conveyance path 110 is arranged. At the downstream side end, an arc-shaped take-out side conveyance path 130 is arranged. Further, a preform 50 conveyed over the feed side conveyance path 110 in a counterclockwise direction D1 is moved to a support member 20 held at the front end of a holder member 11 of the drum 10. Due to rotation of the drum 10, the preform 50 moves over the path of movement 120 in the clockwise direction D2. The preform 50 moving over the path of movement 120 is moved at the downstream side end from the support member 20 to the take-out side conveyance path 130, then moves over the take-out side conveyance path 130 in the counterclockwise direction D1 to be conveyed toward a blow molding zone.

The portion of the path of movement 120 from a predetermined position near the feed side conveyance path 110 to a predetermined position near the take-out side conveyance path 13 is set as the heating region. A plurality of heating devices 31a to 31h are arranged along the outer side of the path of movement 120 in the heating region. Further, heating devices 32a and 32b are arranged along the inner side of a predetermined part of the heating region near the take-out side conveyance path 130 so as to face the heating devices 31g and 31h. Below, the region in the heating region where heating devices 31a to 31f are arranged at just the outer side of the path of movement 120 is referred to as the "first region part", while the region where the heating devices 31g, 31h and 32a, 32b are arranged at the two sides straddling the path of movement 120 is referred to as the "second region part".

A chain guide mechanism 121 is arranged along the upstream side end of the path of movement 120 to the first region part of the heating region. After the chain guide mechanism 121, a magnet guide mechanism 122 is arranged along the path extending to the downstream side of the path of movement 120 including the second region part of the heating region. Details of these chain guide mechanism 121 and magnet guide mechanism 122 will be explained later.

Referring to FIG. 2 and FIG. 3, each support member 20 has a pipe-shaped body 21 and a mount 22 fastened by being fit over the front end thereof. At the outer circumferential surface of the end of the body 21 at the reverse side of the end to which the mount 22 is fastened, a ring-shaped magnetic pole member 24 (second magnetic pole member) at which a plurality of magnetic pole pieces are arranged so as to surround the outer circumferential surface is provided. At a predetermined portion of the body 21 above the position where the ring-shaped magnetic pole member 24 is provided, a sprocket 23 having teeth sticking out in a radial manner (ring-shaped tooth member) is provided.

Each holder member 11 has an arm 11a fixed to the outer circumferential surface 10a of the drum 10 at one end and extending outward radially and a holder body 11b formed at the front end of the arm 11a. Inside the holder body 11b, two bearings 11c, 11d are provided arranged in the vertical direction (same direction as axis of rotation of drum 10) with a predetermined clearance. By these bearings 11c, 11d, the portion between the mount 22 and sprocket 23 of the body 21 at the support member 20 is held to be freely rotable. Further, a preform 50 is supported by the support member 20 in a state mounted to the front end of the mount 22. The positional relationship between the heating devices 31a (31b to 31h) and 32a (32b) and the preform 50 supported at the front end of the support member 20 is one where they face each other. The preform 50 supported by the support member 20 moving over the path of movement 120 is heated by the heating devices 31a to 31h, 32a, and 32b.

The chain guide mechanism 121, as shown in FIG. 2, is structured fastened to the fastening member 121b so that the chain belt 121a faces the support member 20 held by the holder member 11. The sprocket 23 of the support member 20 (ring-shaped tooth member) meshes with a chain belt 121a (belt-shaped tooth receiving member). The chain guide mechanism 121 and the sprocket 23 meshed with its chain belt 121a configure the first control mechanism part in the control mechanism for controlling the rotational state of the support member 20.

The magnet guide mechanism 122, as shown in FIG. 3, is structured fastened to the fastening member 122b so that the belt-shaped magnetic pole member 122a (first magnetic pole member) faces the ring-shaped magnetic pole member 24 of the support member 20 held at each holder member 11 (second magnetic pole member) across a predetermined clearance. More specifically, as shown in FIG. 4, the ring-shaped magnetic pole member 24 is structured with a plurality of magnetic poles P2 arranged at the outer circumferential surface so that the polarity alternately changes between the S polarity and N polarity. Further, the belt-shaped magnetic pole member 122a is structured with the plurality of magnetic poles P1 all having the same polarity (for example, the single polarity of the N polarity) at the surface facing the ring-shaped magnetic pole member 24. For example, referring to FIG. 5A of the C-C cross-section in FIG. 4, the ring-shaped magnetic pole member 24 is comprised of magnetic pole pieces each forming a pair of magnetic poles (S/N) in the diametrical direction (left-right direction in FIG. 5A) arranged in a ring so as to alternately change in orientation. As a result, a plurality of magnetic poles P2 are arranged at the outer circumferential surface so as to alternately change in polarity between the S polarity and N polarity. Further, the belt-shaped magnetic pole member 122a is comprised of magnetic pole pieces each forming a pair of magnetic poles (S/N) in the horizontal direction (left-right direction in FIG. 5A) arranged by the same orientation. As a result, a plurality of magnetic poles P1 are arranged so as to all have the same polarity (N polarity or S polarity) with respect to the surface facing the ring-shaped magnetic pole member 24.

Note that the magnet guide mechanism 122 and the ring-shaped magnetic pole member 24 facing its belt-shaped magnetic pole member 122a configures the second control mechanism part in the control mechanism for controlling the rotational state of the support member 20.

Further, the magnetic pole pieces of the ring-shaped magnetic pole member 24 and belt-shaped magnetic pole member 122a can also be configured as shown in FIG. 5. That is, the ring-shaped magnetic pole member 24 is comprised of magnetic pole pieces each forming a pair of magnetic poles (S/N) in the axial direction (up-down direction in FIG. 5B) so as to alternately change in orientation. As a result, a plurality of magnetic poles P2 are arranged on the upper part of the outer circumferential surface so as to alternately change in polarity between the S polarity and N polarity. Further, the belt-shaped magnetic pole member 122a is comprised of magnetic pole pieces each forming a pair of magnetic poles (S/N) in the vertical direction (up-down direction in FIG. 5B) arranged by the same orientation. As a result, a plurality of magnetic poles P1 are arranged so as to all have the same polarity (N polarity or S polarity) with respect to the surface facing the upper part of the outer circumferential surface of the ring-shaped magnetic pole member 24.

In the preform heating system 100 explained above, when a preform 50 conveyed over the feed side conveyance path 110 in the counterclockwise direction D1 is transferred to a support member 20 held at a holder member 11 of the drum 10 in a freely rotable manner and is mounted on a mount 22, the rotation of the drum 10 causes the support member 20 supporting the preform 50 to move to the path of movement 120 in the clockwise direction D2. When the support member 20 moves through the first region part of the heating region at the path of movement 120, the sprocket 23 of the support member 20 meshes with the chain belt 121a of the chain guide mechanism 121 (see FIG. 2), so along with movement of the support member 20, the sprocket 23 rotates and, due to the rotational force, the support member 20 held by the holder member 11 rotates. Due to this, at the first region part of the heating region, the orientation of each preform 50 with respect to the heating devices 31a to 31f gradually changes (rotates) along with the movement and the circumferential surface of the preform 50 is substantially uniformly heated.

Next, when the support member 20 enters the second region part of the heating region in the path of movement 120, the sprocket 23 is detached from the chain belt 121a of the chain guide mechanism 121 and the ring-shaped magnetic pole member 24 faces the belt-shaped magnetic pole member 122a of the magnet guide mechanism 122 (see FIG. 3). In this state, furthermore, when the rotation of the drum 10 causes the support member 20 to move, as shown in FIG. 4, the magnetic poles P2 of the ring-shaped magnetic pole member 24 having a polarity (S polarity) opposite to the polarity (N polarity) of the magnetic poles P1 of the belt-shaped magnetic pole member 122a are attracted by the magnetic poles P1 of the belt-shaped magnetic pole member 122a. Due to this attraction force of the ring-shaped magnetic pole member 24 and the belt-shaped magnetic pole member 122a, a support member 20 held freely rotably at a holder member 11 moves over the path of movement 120 in the clockwise direction D2 along with rotation of the drum 10 without rotating (a rotational state of "no rotation").

Due to this, in the second region part of the heating region, the orientation of a preform 50 with respect to the heating devices (31g, 32a), (31h, 32b) straddling the path of movement 120 is held constant without change whereby the portions of the preform 50 facing the heating devices (31g, 32a), (31h, 32b) are concentratedly heated. As a result, the temperature distribution of the outer surface of the preform 50 is suitable for when producing a bottle not having a circular or other uniform cross-section, but having a cross-section with a length in the diametrical direction not becoming even in all directions, for example, an oval shaped cross-section or a flat rectangular shaped cross-section, by blow molding.

The preform 50 heated in this way and moving over the path of movement 120 is, at its downstream side end, moved over from the support member 20 to the take-out side conveyance path 130, moves over the take-out side conveyance path 130 in the counterclockwise direction D1, and thus is conveyed toward the blow molding zone. In the take-out side conveyance path 130, the preform 50 is conveyed to be loaded into the blow molding zone by a suitable orientation based on the orientation when being moved over from the support member 20.

By the way, when heating the pre form 50 so that the temperature distribution of its outer surface becomes uniform in order to form a bottle with a circular cross-sectional shape, the belt-shaped magnetic pole member 122a of the magnet guide mechanism 122 is changed from a structure where a plurality of magnetic poles P1 are arranged forming a single polarity (for example, N polarity) at the surface facing the ring-shaped magnetic pole member 24 along the path of movement 120 (see FIG. 4) to a structure where a plurality of magnetic poles P1 are arranged so as to alternately change in polarity between the S polarity and N polarity at the surface as shown in FIG. 6. For example, as shown in FIG. 5A, it is possible to arrange magnetic pole pieces each forming a pair of magnetic poles (S/N) in the horizontal direction so as to alternately change in orientation so as to arrange a plurality of magnetic poles P1 alternately changing in polarity on the surface facing the ring-shaped magnetic pole member 24. Further, for example, as shown in FIG. 5B, it is possible to arrange magnetic pole pieces each forming a pair of magnetic poles (S/N) in the vertical direction so as to alternately change in orientation so as to arrange a plurality of magnetic poles P1 alternately changing in polarity on the surface facing the upper part of the outer circumferential surface of the ring-shaped magnetic pole member 24.

In such a preform heating system 100, at the first region part of the heating region, in the same way as explained above, the sprocket 23 of a support member 20 meshes with the chain belt 121a of the chain guide mechanism 121 (see FIG. 2), so rotation of the sprocket 23 causes the support member 20 to move over the path of movement 120 while rotating. Due to this, the outer surface of the preform 50 supported by the support member 20 is substantially uniformly heated by the heating devices 31a to 31f.

When the support member 20 enters the second region part of the heating region in the path of movement 120, the sprocket 23 is detached from the chain belt 121a and the ring-shaped magnetic pole member 24 faces the belt-shaped magnetic pole member 122a of the magnet guide mechanism 122 (see FIG. 3). In this state, if further rotation of the drum 10 causes the support member 20 to move, as shown in FIG. 6, repulsion (same polarity) and attraction (different polarity) are alternately repeated between the ring-shaped magnetic pole member 24 of the support member 20 and the belt-shaped magnetic pole member 122a of the magnet guide mechanism 122. As a result, the support member 20 rotates while moving over the path of movement 120. Due to this, the outer surface of the preform 50 supported by the support member 20, in the same way as the case of the first region part, is substantially uniformly heated by the heating devices (31g, 32a), (31h, 32b). Therefore, the preform 50 becoming substantially uniform in temperature distribution of its outer surface is transferred, at the downstream side end of the path of movement 120, from the support member 20 to the take-out side conveyance path 130 and is conveyed toward the blow molding zone while moving over the take-out side end 130.

According to the preform heating system 100 explained above, if using a structure where a plurality of magnetic poles P1 are arranged so as to all have the same polarity along the path of movement 120 as the belt-shaped magnetic pole member 122a of the magnet guide mechanism 122 (see FIG. 9), in the second region part of the heating region, the support member 20 will move over the path of movement 120 without rotating. On the other hand, if using a structure where a plurality of magnetic poles P1 are arranged so as to alternately change in polarity between the S polarity and N polarity along the path of movement 120 as the belt-shaped magnetic pole member 122a (see FIG. 6), in the second region part of the heating region, the support member 20 will move over the path of movement while rotating. In this way, by just changing the belt-shaped magnetic pole member 122a of the magnet guide mechanism 122, it is possible to make the support member 20 supporting the preform 50 move while rotating and move in the state stopping rotation of the support member 20 through the second region part of the heating region. Therefore, in the second region part of the heating region, it is possible to make the preform 50 move while rotating without changing the heating operations of the heating devices 31g, 31h, and 31b arranged and sacrificing efficient heating and to make it move without rotating.

Note that if a system making the support members 20 move in the state stopped in rotation at all times in the second region part of the heating region, the ring-shaped magnetic pole member 24 provided at the support member 20, for example, may be provided so that a single magnetic pole piece forming a pair of magnetic poles (S/N) is set at part of the outer circumferential surface or so that a plurality of the magnetic pole pieces are dispersed over the outer circumferential surface so that magnetic poles P2 of polarities opposite to the polarity of the belt-shaped magnetic pole member 122a are arranged there. Further, if a system making the support members 20 move in the state constantly rotated in the heating region as a whole, it is possible to detach the chain guide mechanism 121 and make the belt-shaped magnetic pole member 122a (magnet guide mechanism 122) of a structure where a plurality of magnetic poles P1 are arranged so that the polarity alternately changes between the S polarity and N polarity (see FIG. 6) extend over the entire region from the upstream side end of the path of movement 120 to the downstream side end. In this case, it is possible to eliminate the sprockets 23 from the support members 20.

Further, the polarity pattern of the plurality of magnetic poles P1 arranged at the surface of the belt-shaped magnetic pole member 122a of the magnet guide mechanism 122a facing the ring-shaped magnetic pole member 24 may be freely determined aside from being made the above-mentioned pattern of the same single polarity or pattern of alternately changing polarities. In this case, the support member 20 can move through the heating region in a rotational state (including stopped rotational state) in accordance with the pattern of polarity of the belt-shaped magnetic pole member 122a and heat the outer surface of the preform 20 to give a temperature distribution in accordance with that rotational state. As a result, it is possible to blow mold a bottle with a more complicated cross-sectional shape.

The magnetic pole pieces for forming the magnetic poles P1 of the belt-shaped magnetic pole member 122a can be formed by regular magnets (permanent magnets), but can also be formed by electromagnets. In the latter case, rather than changing the belt-shaped magnetic pole member 122a itself, it is possible to control the current run through the magnetic poles P1 so as to change the polarity pattern (for example, single polarity or alternately changing polarity). Therefore, it is easily possible to make a support member 20 supporting a preform 50 move while rotating and make it move in a state with the rotation of the support member 20 stopped.

Further, the relationship between the magnetic poles of the ring-shaped magnetic pole member 24 and the magnetic poles of the belt-shaped magnetic pole member 122a may be one as shown in FIG. 7. When making the support member 20 move without rotating, the ring-shaped magnetic pole member 24, in the same way as shown in FIG. 5B, is arranged so that the magnetic pole pieces each forming a pair of magnetic poles (S/N) in the axial direction are alternately changed in orientation. Further, the belt-shaped magnetic pole member 122a is arranged so that the magnetic pole pieces each forming a pair of magnetic poles (S/N) in the vertical direction have the same orientation. Due to this, a plurality of magnetic poles P21 are arranged so that the polarity alternately changes between the S polarity and N polarity at the upper part of the outer circumferential surface of the ring-shaped magnetic pole member 24 and magnetic poles P22 are arranged so that the polarity alternately changes between the N polarity and S polarity at the lower part of the outer circumferential surface. Further, a plurality of magnetic poles P11 are arranged becoming the same polarity (for example, N polarity) on the surface of the belt-shaped magnetic pole member 122a facing the upper part of the ring-shaped magnetic pole member 24 and a plurality of magnetic poles P12 are arranged becoming the same polarity (for example, S polarity) on the surface facing the lower part of the ring-shaped magnetic pole member 24. In this case, the state where the ring-shaped magnetic pole member 29 and the belt-shaped magnetic pole member 122a attract each other is maintained and the support member 20 supporting the preform 50 moves over the path of movement 120 in the clockwise direction D2 without rotating.

On the other hand, when trying to make the support member 20 move while rotating, the belt-shaped magnetic pole member 122a shown in FIG. 7 is arranged so that the magnetic pole pieces each forming a pair of magnetic poles (S/N) in the vertical direction alternately change orientation. In this case, a repulsion (same polarity) and attraction (different polarity) alternately repeat between the ring-shaped magnetic pole member 24 and the belt-shaped magnetic pole member 122a and the support member 20 rotates while moving over the path of movement 120.

Note that the positional relationship between the sprocket 23 and the ring-shaped magnetic pole member 24 in the support member 20, as shown in FIG. 2 and FIG. 3, may be one where the sprocket 23 is at the upper side or conversely where the ring-shaped magnetic pole member 24 is at the upper side. However, the set positions of the chain guide mechanism 121 and magnet guide mechanism 122 provided along the path of movement 12 (positions in height direction) are determined based on the positions of the sprocket 23 and ring-shaped magnetic pole member 24.

In the above-mentioned example, a predetermined clearance was formed between the ring-shaped magnetic pole member 24 and the belt-shaped magnetic pole member 122a, but it is possible to make the ring-shaped magnetic pole member 24 abut against the belt-shaped magnetic pole member 122a. In this case, when the support member 20 moves without rotating, the ring-shaped magnetic pole member 24 moves while sliding over the belt-shaped magnetic pole member 122a. On the other hand, when the support member 20 moves while rotating, the ring-shaped magnetic pole member 24 moves while rolling over the surface of the belt-shaped magnetic pole member 122a.

INDUSTRIAL APPLICABILITY

Above, the preform heating system according to the present invention has the effect of easily enabling a preform to be moved through a heating region while making it rotate without greatly sacrificing efficient heating and enabling it to be moved through the heating region without making it rotate. It is useful as a preform heating system for heating a plastic preform for forming a container by blow molding before the blow molding.

The invention claimed is:

1. A preform heating system having a movement mechanism making a support member able to rotate while the support member is supporting a plastic preform for forming a container by blow molding move over a predetermined path, heating devices provided along a heating region set on said path and heating said preform supported by said moving support member, and a control mechanism controlling a rotational state of said support member moving through said heating region and controlling an orientation of said preform with respect to said heating devices, wherein said control mechanism has a first magnetic pole member arranged along at least a part of said heating region and a second magnetic pole member fastened to said support member so that when said support member moves through said heating region, it faces said first magnetic pole member, and said support member moving through said heating region is made a rotational state determined by the relationship between the polarity of the first magnetic pole member and the polarity of the second magnetic pole member.

2. The preform heating system as set forth in claim 1, wherein said first magnetic pole member has a single polarity at a surface facing the second magnetic pole member, and said second magnetic pole member has magnetic poles of a polarity opposite to said single polarity arranged at a surface facing the first magnetic pole member.

3. The preform heating system as set forth in claim 2, wherein said second magnetic pole member is fastened to said support member so as to become coaxial with its axis of rotation and a plurality of magnetic poles are arranged in a ring so that their polarities alternately change.

4. The preform heating system as set forth in claim 1, wherein said first magnetic pole member has a plurality of magnetic poles arranged so as to alternately change in polarity at a surface facing the second magnetic pole member, and said second magnetic pole member is fastened so that its axis of rotation becomes coaxial with said support member and has a plurality of magnetic poles arranged in a ring so as to alternately change in polarity.

5. The preform heating system as set forth in claim 1, wherein said control mechanism has a first control mechanism part and a second control mechanism part, said first mechanism part has a ring-shaped tooth member provided at said support member so as to become coaxial with an axis of rotation of said support member and belt-shaped tooth receiving member arranged along a predetermined part of said heating region and engaging with said ring-shaped tooth member while rotating, said second mechanism part has said first magnetic pole member and said second magnetic pole member, and said first magnetic pole member is set at a part other than said predetermined part of said heating region.

6. The preform heating system as set forth in claim 5, wherein said second magnetic pole member is fastened to said support member so as to become coaxial with its axis of rotation and has a plurality of magnetic poles arranged in a ring so as to alternately change in polarity.

* * * * *